Oct. 1, 1929.  J. F. O'CONNOR  1,729,627
SHOCK ABSORBER FOR VEHICLES
Filed Aug. 30, 1926
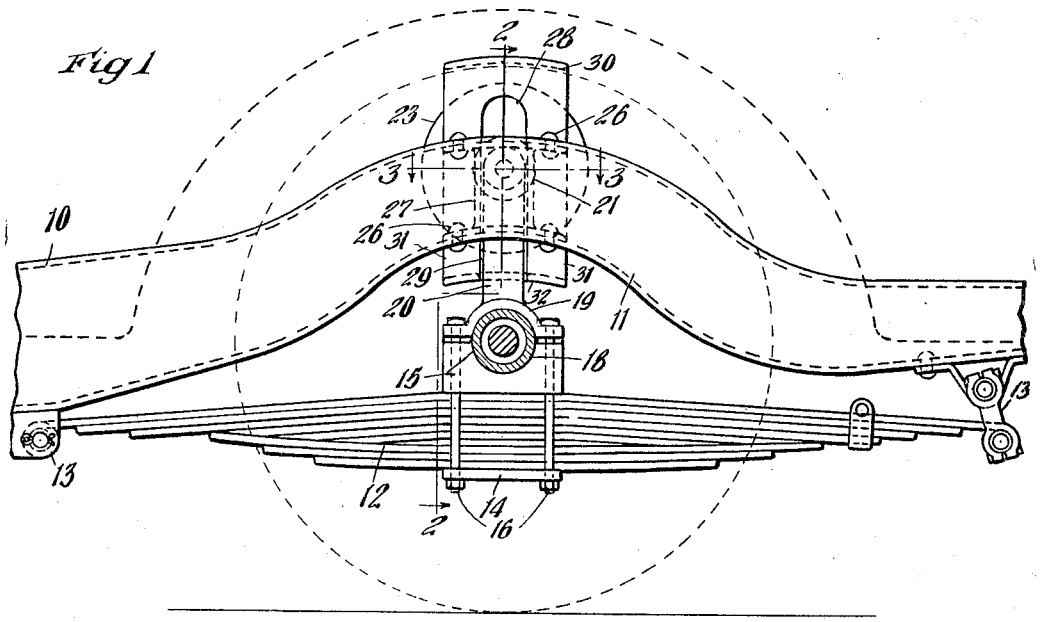
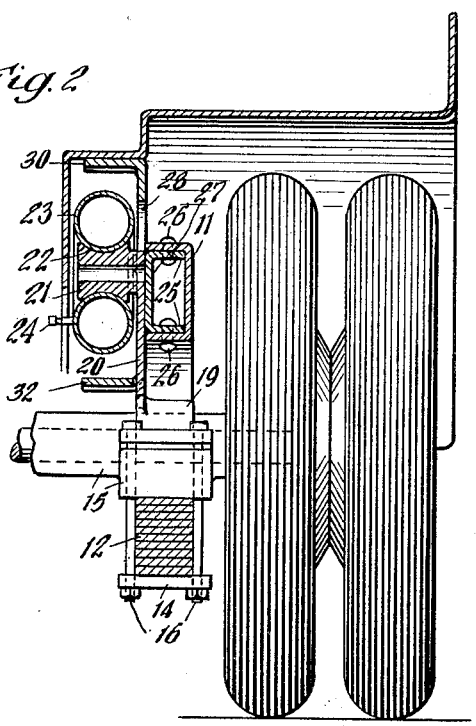
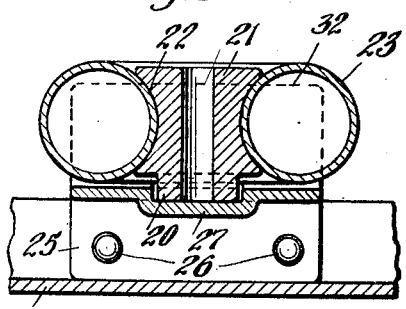
Inventor
John F. O'Connor
Witness
Wm. Geiger
By George I. Haight
His Atty.

Patented Oct. 1, 1929

1,729,627

UNITED STATES PATENT OFFICE

JOHN F. O'CONNOR, OF CHICAGO, ILLINOIS, ASSIGNOR TO W. H. MINER, INC., OF CHICAGO, ILLINOIS, A CORPORATION OF DELAWARE

SHOCK ABSORBER FOR VEHICLES

Application filed August 30, 1926. Serial No. 132,481.

This invention relates to improvements in shock absorbers for vehicles.

One object of the invention is to provide a simple and efficient shock absorber of a compact design more particularly adapted for motor vehicles.

Another object of the invention is to provide a mechanism of the character indicated, which operates in conjunction with the usual vehicle springs to absorb excessively heavy shocks to which the vehicle is subjected.

A further object of the invention is to provide a shock absorbing mechanism for motor vehicles, and especially heavy vehicles of the bus type, wherein the shock absorbing means act in conjunction with the usual vehicle springs and are rendered operative to absorb excessive shocks after the vehicle springs have been compressed to a predetermined extent in absorbing the lighter shocks.

A more particular object of the invention is to provide shock absorbing means adapted to cooperate with the frame member and spring member of a vehicle, and wherein one of said members is provided with a pneumatic cushioning element, and the other member is provided with abutment means against which the cushioning element bears after the vehicle springs have been flexed a pre-determined extent to absorb the heavy shocks which occur upon unusual relative movement between the springs and the body of the vehicle.

Other and further objects of the invention will more clearly appear from the description and claims hereinafter following.

In the drawing, forming a part of this specification, Figure 1 is an elevational view of the rear portion of one side of a vehicle as viewed from the outer side of one frame member of the chassis, the axle and axle housing being shown in section, and the rear wheel and fender in dotted lines, the invention being illustrated as associated with the spring assembly and the inner side of the frame member. Figure 2 is a transverse vertical sectional view corresponding substantially to line 2—2 of Figure 1 and showing the usual fender in section and wheels in elevation. And Figure 3 is an enlarged horizontal sectional view taken substantially on the line 3—3 of Figure 1.

As shown in the drawing 10 represents a side frame member of the vehicle of the usual channel formation, having a curved off-set 11, which is spanned by the usual leaf spring assembly 12, said assembly being secured at its ends to the frame 10 by shackles indicated at 13. The spring assembly intermediate its ends is secured by means of a clamp comprising a bottom plate 14 and top plate 15, said plates being secured together by a plurality of bolts indicated at 16. The top plate 15 is provided with the axle housing 18. A plate 19 having a curved intermediate section disposed about the axle housing 18 is provided, the ends of the plate 19 being secured in position by the bolts 16.

Preferably formed integrally with the plate 19 is a plunger 20, said plunger extending upwardly to one side of the channel member 10 as shown. The upper extremity of the plunger 20 is provided with a laterally extending annular support 21, which may be formed integrally with said plunger as shown. The support 21 is provided with a circumferentially extending concave seat 22 in its edge adapted for the reception of a pneumatic cushioning element 23. The cushioning element preferably comprises a hollow tubular ring formation made up of fabric and rubber, and provided with a valve nipple 24 through which the cushioning member may be inflated. The cushioning member 23 when disposed upon the concave seat and inflated becomes fixed with reference to the support as will be understood. Instead of the closed tube shown, the cushioning member may comprise an outer casing and inner tube in the manner ordinarily provided in connection with pneumatic automobile tires, without departing from the spirit of the invention.

Mounted upon the frame 10 is an abutment member adapted to co-operate with the cushioning element, said member comprising a bracket including a vertically disposed plate having laterally extending flanges 25—25 disposed between the flanges of the channel frame member 10, said flanges being secured to the flanges of the frame member 10 by suitable rivets indicated at 26. A central portion of the plate is off-set as indicated at 27, and at the upper side of the off-set portion the plate is cut out as indicated at 28, said plate also being cut out below the off-set portion 27 as indicated at 29, the off-set portion 27, and cut-out portions 28 and 29 providing clearance for reciprocation of the plunger 20 and also providing guiding means for said plunger during its movement. The upper marginal portion of the plate is provided with a laterally extending flange 30, which is preferably curved on an arc having a radius greater than the radius of the cushioning element 23, the flange 30 being spaced from the cushioning member a suitable distance so that the cushioning member does not come into contact with the abutment flange 30 except when the parts are moved a relative greater distance than normally is the case, when subjected to heavier shocks. The lower marginal edges of the portions 31—31 arranged at opposite sides of the cut-out 29 are provided with lateral flanges 32—32 which are curved along an arc substantially parallel with the arc defined by the flange 30, the flanges 32—32 being spaced a suitable distance from the cushioning member when the parts are in normal position, but serving to provide abutments with which the cushioning member comes into contact to absorb the heavier shocks which effect excessive relative movement between the parts. Owing to the concavity of engaging surface on flange 30, and the convexity of engaging face on flange 32, the resistance offered by the cushion is intensified on the downward movement of the chassis, and recoil is overcome more gradually.

In operation, the vehicle springs will take care of the lighter shocks, the vibration of the springs being transmitted to the plunger 20 without causing sufficient movement thereof to cause engagement between the cushioning member 23 and the abutments provided by the flanges 30 and 32—32. When the vehicle encounters conditions which bring about excessive inward movement of the ordinary springs, the plunger 20 is reciprocated upwardly to such an extent as to bring the cushioning member 23 into contact with the flange 30 of the abutment plate, the cushioning member then being effective in aiding the spring to absorb unusual shock. Upon rebound of the spring, the plunger 20 will be reciprocated downwardly and excessive movement of the spring downwardly will cause the cushioning member to come into contact with the flanges 32—32 of the abutment member and hence aid in neutralizing or absorbing the shock incident to the rebound of the spring.

While I have herein shown and described what I consider the preferred manner in carrying out the invention, the same is merely illustrative, and I contemplate all changes and modifications which come within the scope of the claims appended hereto.

I claim:

1. In a shock absorbing mechanism, the combination with a vehicle frame member and spring member for directly supporting said frame; of a bracket mounted on one of said members and provided with spaced abutments; a plunger mounted on the other of said members and provided with annular pneumatic cushioning means normally spaced from both of said abutments and adapted to have co-operating engagement with said abutments to cushion shocks after a predetermined distorting movement of said spring member.

2. In a shock absorbing mechanism, the combination with a vehicle frame member, and a spring member for directly supporting said vehicle; of a bracket secured to said frame member, said bracket having spaced flanges providing spaced abutments; a plunger secured to said spring member and provided with an annular support having a circumferentially extending seat, a ring-shaped pneumatic cushioning member arranged on said seat, said cushioning member being normally spaced from the spaced abutment flanges of said bracket, and adapted to engage the same after predetermined relative movement between said frame member and spring member to absorb the heavier shocks.

3. In a shock absorbing mechanism, the combination with a vehicle frame member, and a spring member for directly supporting said vehicle; of a bracket attached to said frame member, said bracket being provided with a pair of spaced abutments; a plunger secured to said spring member and provided with an annular support having a circumferentially extending seat, a ring-shaped pneumatic cushioning member arranged on said seat, said cushioning member being normally spaced from both of said abutments to an extent to engage the said abutments after predetermined relative movement between said frame member and spring member.

4. In a shock absorbing mechanism the combination with a vehicle body member and an axle member and springs supported on opposite ends of the axle member and directly attached to said body member for yieldingly supporting the same; of cushioning means mounted on opposite ends of the axle member and movable therewith; two sets of fixed spaced abutment members on the body member above the axle at opposite ends of the same, said abutment members of each set being normally spaced from said cushioning means a predetermined distance so that the cushioning means at one end of the axle will engage one of said spaced abutment members of the corresponding set when the spring member is flexed in one direction, and the other spaced abutment members of said set when the spring is flexed in the opposite direction, to absorb heavy shocks and to relieve the spring from undue strain.

In witness that I claim the foregoing I have hereunto subscribed my name this 27th day of August 1926.

JOHN F. O'CONNOR.